US011219881B2

(12) United States Patent
Hämäläinen et al.

(10) Patent No.: US 11,219,881 B2
(45) Date of Patent: Jan. 11, 2022

(54) METHOD FOR REGENERATING CATALYSTS USED FOR PRODUCTION OF POLYSULPHIDE COOKING LIQUORS

(71) Applicant: Andritz Oy, Helsinki (FI)

(72) Inventors: Sanna Hämäläinen, Metsä (FI); Pekka Kittilä, Metsä (FI); Outi Poukka, Metsä (FI)

(73) Assignee: Andritz Oy, Helsinki (FI)

( * ) Notice: Subject to any disclaimer, the term of this patent is extended or adjusted under 35 U.S.C. 154(b) by 393 days.

(21) Appl. No.: 15/569,785

(22) PCT Filed: Apr. 27, 2016

(86) PCT No.: PCT/FI2016/050271
§ 371 (c)(1),
(2) Date: Oct. 27, 2017

(87) PCT Pub. No.: WO2016/174308
PCT Pub. Date: Nov. 3, 2019

(65) Prior Publication Data
US 2018/0133692 A1    May 17, 2018

(30) Foreign Application Priority Data

Apr. 27, 2015  (FI) .................... 20155307

(51) Int. Cl.
*B01J 21/20* (2006.01)
*B01J 38/64* (2006.01)
(Continued)

(52) U.S. Cl.
CPC ............ *B01J 21/20* (2013.01); *B01J 21/18* (2013.01); *B01J 38/62* (2013.01); *B01J 38/64* (2013.01); *C01B 17/34* (2013.01); *Y02P 20/584* (2015.11)

(58) Field of Classification Search
CPC ... B01J 21/18; B01J 21/20; B01J 38/62; B01J 38/64; B01J 23/889; B01J 38/48;
(Continued)

(56) References Cited

U.S. PATENT DOCUMENTS 3,460,913 A    8/1969  Hoekstra
4,024,229 A *  5/1977  Smith ............... C01B 17/34
                                                  423/562

(Continued)

FOREIGN PATENT DOCUMENTS

CA    814882 A    6/1969
CA    959628      12/1974
(Continued)

OTHER PUBLICATIONS

Guang Zhu: Foundation of Pulp and Paper Technology. Harbin Engineering University Press, Feb. 29, 2008. (English translation included).

(Continued)

*Primary Examiner* — Anthony J Zimmer
*Assistant Examiner* — Syed T Iqbal
(74) *Attorney, Agent, or Firm* — Laine IP Oy

(57) ABSTRACT

A method of regenerating an activated carbon catalyst which is used in the production of polysulphide liquor. In the method, the catalyst is washed with a washing liquid in order to remove the sediment accumulated in the catalyst. According to the present invention, in this case, the activated carbon catalyst is regenerated most suitably by bringing it to a multi-stage washing which comprises at least one washing step in which the washing liquid used comprises sodium sulphide, and one washing step in which acidic washing liquid is used. The sulphur precipitate is peeled off using (Continued)

Figure 1:
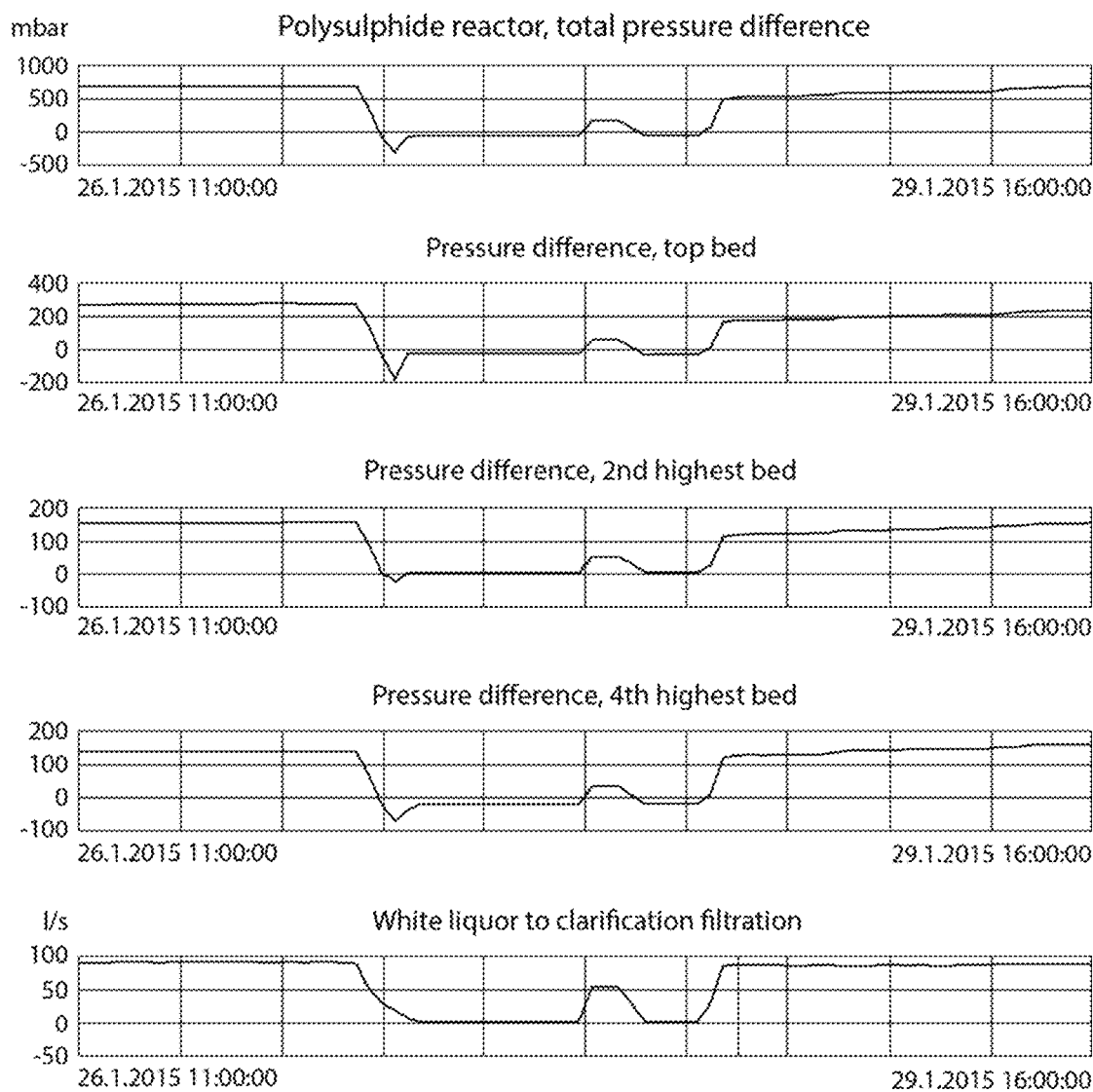

sodium sulphide, and the iron and other metals can be effectively removed by using an acidic washing, without damaging the catalyst.

21 Claims, 2 Drawing Sheets

(51) Int. Cl.
*B01J 21/18* (2006.01)
*C01B 17/34* (2006.01)
*B01J 38/62* (2006.01)

(58) Field of Classification Search
CPC ......... B01J 23/745; B01J 23/78; C01B 17/34; Y02P 20/584; D21C 11/04; D21C 3/02
See application file for complete search history.

(56) References Cited

U.S. PATENT DOCUMENTS

| | | | |
|---|---|---|---|
| 4,162,187 A | 7/1979 | Smith et al. | |
| 4,855,123 A * | 8/1989 | Suzuki | B01J 21/18 423/562 |
| 5,082,526 A | 1/1992 | Dorris | |

FOREIGN PATENT DOCUMENTS

| | | |
|---|---|---|
| CA | 959628 A | 12/1974 |
| CA | 1205930 A | 6/1986 |
| CA | 2118463 | 10/2005 |
| CA | 2118463 C | 10/2005 |
| FI | 57244 | 7/1980 |
| FI | 57244 C | 7/1980 |
| FI | 98538 | 7/1997 |
| FI | 98538 C | 7/1997 |
| JP | S5040395 B1 | 12/1975 |
| JP | S6458344 A | 3/1989 |
| JP | H07114959 B2 | 12/1995 |
| JP | H09510428 A | 10/1997 |
| JP | 2004275936 A | 10/2004 |
| RU | 2053015 C1 | 1/1996 |
| RU | 2295386 C2 | 3/2007 |
| RU | 2361026 C1 | 7/2009 |
| WO | WO9702383 A | 1/1997 |
| WO | WO2006029478 A2 | 3/2006 |
| WO | WO2016174308 A1 | 11/2016 |

OTHER PUBLICATIONS

Wang Qi et al: Status and application of industrial preparation technology of polysulfide cooking liquid. Conference Proceedings of China Technical Association of Paper Industry, May 1, 1999, pp. 134-136. (English translation included).

* cited by examiner

METHOD FOR REGENERATING CATALYSTS USED FOR PRODUCTION OF POLYSULPHIDE COOKING LIQUORS

FIELD OF INVENTION

The present invention relates to the regeneration of the catalyst used in the production of a polysulphide liquor. According to a method of this kind, the catalyst is washed with a washing solution, in particular an aqueous washing solution, in order to remove the precipitate contained in the catalyst.

BACKGROUND ART

In the MOXY process, developed by the Mead Corporation, the production of polysulphide liquor is carried out using a process of oxidising liquor, in which process sodium sulphide is converted into polysulphide liquor, i.e. "orange liquor", by using air or oxygen gas and in the presence of a catalyst. The catalyst used is generally poly(tetrafluoroethylene) coated activated carbon. In the reactor, the catalysts are packed in different layers.

With regard to the art, reference can be made to U.S. Pat. No. 4,024,229.

The activity of the activated carbon catalyst decreases as a function of time due to clogging of the pores of the catalyst. At the same time, the pressure difference in the reactor increases, because the precipitate glues together the catalyst particles, thereby generating a tight "asphalt surface" on the top layer. For this reason, the catalysts of the MOXY process should be reactivated at regular intervals. In general, fresh catalysts are washed approximately once every year. As the catalysts age, the washings must be carried out more frequently, for example approximately every second month during the third year of use.

Generally, the washing, hereinafter also referred to as "activation washing", is carried out using formic acid. The concentration of the formic acid is 4-5%, and this acid washing is normally repeated twice. There are also known solutions in which hydrochloric acid (U.S. Pat. No. 4,855,123) is used in the washing.

The concentration of the hydrochloric acid is generally approximately 3-5%. The washing is carried out once, and its duration is typically approximately 60 minutes.

Although formic acid removes precipitates effectively, the Teflon surfaces of the catalysts may be damaged easily and this shortens the replacement interval of the catalyst, which increases catalyst costs. Washing with hydrochloric acid, in turn, is associated with substantial risks of corrosion. Regardless of the acid used, at least part of the catalyst in the catalyst bed has to be replaced every year, and the catalyst bed is completely replaced every 2-5 years.

CA Application Publication No. 1,205,930 describes a method of purifying the condensate generated in a sulphate process, after the separation of oily components and the solids, in the presence of oxygen, in a column which comprises activated carbon. In the experiments described in the publication, a malodorous condensate was passed together with gas (air) through a column, whereby the odour disappeared and it was possible to remove the hydrogen sulphide and the methyl mercaptan from the condensate. The efficacy of the column decreased as a function of the time. According to the publication, it was possible to regenerate the catalyst by using aqueous steam and white liquor. The publication contains no suggestion that the proposed solution could be applied to the regeneration of other types of activated carbon catalysts.

SUMMARY OF THE INVENTION

It is an aim of the present invention to eliminate at least some of the disadvantages associated with the prior art and to provide a novel method of regenerating the activated carbon catalyst which is used in the production of polysulphide liquor.

In particular, it is an aim of the present invention to provide a method of regenerating the activated carbon catalyst which is used in the production of polysulphide liquor, in situations where the polysulphide is produced by oxidation from white liquor which comprises substantial iron contents. Typically, such white liquor contains at least 1 mg/l, especially at least 2 mg/l, in particular at least 4 mg/l of iron.

When there are significant amounts of iron and possibly other foreign matters present in the white liquor, the problems associated with clogging of the activated carbon catalyst are more pronounced. Normally, the iron can be removed from the chemical circulation of a pulp mill as precipitated iron sulphide in association with the clarification of green liquor. However, the clarification of the green liquor is followed by a lime cycle, which includes a lime sludge re-burning kiln in which the sodium hydroxide is regenerated and the calcium carbonate is burned to calcium oxide. When the fuel used is a product gas, which is made from bark or wood chips, or by gasification of similar wood fuels, the iron compounds associated with the bark or with the wood chips or similar wood fuel, and other foreign matters, enter the lime cycle, from where part of them are transported further to the white liquor.

In connection with the present invention, we have found that the iron present in the white liquor, which iron is in dissolved form, is oxidised in the MOXY reactor to trivalent iron, due to the effect of oxygen or air. The trivalent iron, in turn, oxidises the sulphide to elemental sulphur according to Formula I:

$$2Fe^{3+}+S^{2-} => 2Fe^{2+}+S° \qquad I$$

The elemental sulphur thus generated is precipitated, together with the iron, into the catalyst, thereby forming a poorly soluble precipitate. The precipitate glues the catalyst particles together, thus generating a tight "asphalt surface" on the top layer.

Experiments have shown that this precipitate is difficult to remove by using current methods. Formic acid does not significantly remove any iron, and no elemental sulphur at all. Hydrochloric acid removes the iron, but its use is associated with a significant risk of corrosion and is therefore not a recommended solution. Also, hydrochloric acid fails to remove sulphur.

The present invention is based on the idea that the catalyst is washed using a solution comprising sodium sulphide. Unexpectedly, it has been found that the precipitate, which comprises elemental sulphur, and which is formed in the catalyst during the process, can be effectively dissolved away by using an aqueous solution comprising sodium sulphide.

More specifically, the method according to the present invention is characterised by what is stated in the characterising part of claim 1.

Considerable advantages can be achieved with the present invention. The sodium sulphide washing does not consume any catalyst. The treatment dissolves elemental sulphur and lowers the pressure difference between the catalyst beds, particularly the upmost bed, in the same way as or even more effectively than acidification using formic acid does. At the same time, at least part of the iron precipitate can be removed.

Rinsing with sodium sulphide (white liquor rinsing) does not involve a risk of generating hydrogen sulphide, as acidification does.

Washing with sodium sulphide, especially when it is carried out using an industrial sodium sulphide flow, such as using a white or green liquor or a mixture thereof, will bring significant savings in the acidification costs, and in future catalyst costs.

If desired, the washing with sodium sulphide can be combined for example with washing with hydrochloric acid, if effective removal of iron is wanted, or combined with washing with formic acid or hydrochloric acid if partial removal of iron, manganese, calcium and magnesium is wanted. By washing with sodium sulphide, it is possible to skim off sulphur and at the same time contribute to the washing of the metal-containing precipitate, in which case, after the sodium sulphide treatment, it is easier to dissolve the metals from the sediment by using an acid washing.

Washing with sodium sulphide can significantly reduce the number of acid washings and thus significantly reduce the catalyst consumption and, correspondingly, corrosion problems.

In the following, the embodiments will be examined with reference to the accompanying drawings.

SHORT DESCRIPTION OF THE DRAWINGS

Figure 2:
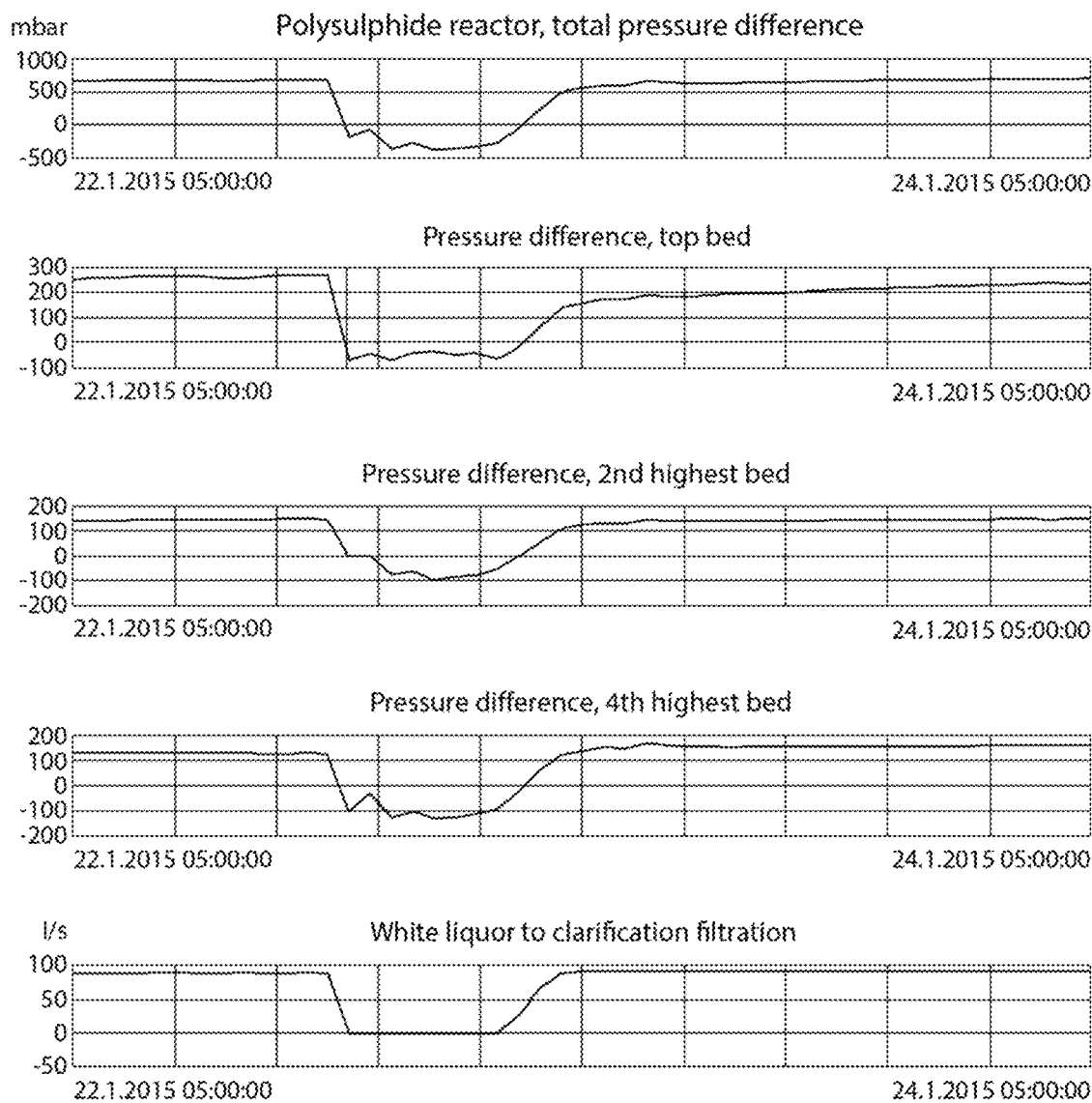

FIG. 1 shows the drops in pressure of the activated carbon column beds as a function of time, after the white liquor washing, and FIG. 2 shows the drops in pressure of the activated carbon column beds as a function of time, after the formic acid washing.

EMBODIMENTS

As preliminarily stated above, the present technology provides a method of regenerating in particular such an activated carbon catalyst, which is used in the production of polysulphide liquor, by oxidising white liquor that comprises iron, in the presence of the said catalyst. The white liquor comprises in particular essential iron contents.

"Essential iron contents" means, in particular, that the white liquor to be oxidised contains 1 mg of iron per litre of white liquor, especially at least 2 mg/l, in particular at least 4 mg/l and even 6 mg/l. In practice, the white liquor may be saturated with iron (approximately 0.1 mmol/l).

"The iron content" means in particular the combined concentration of the iron contents of various iron compounds (ferrous and ferric compounds).

In one embodiment, the white liquor to be oxidised is obtained from the chemical cycle of a sulphate or polysulphide mill, where non-fossil fuel is used in the lime sludge re-burning.

In the pulp industry, the use of non-fossil fuels is increasing, which makes it possible to operate according to the principles of sustainable development. Traditionally, the lime sludge re-burning kiln fuel has been a heavy fuel oil or natural gas, but the aim has been to replace these in the lime sludge re-burning with wood-based fuels, such as bark or wood chips or similar wood fuels. One consequence, however, is that iron and other foreign matters, such as manganese, calcium and magnesium compounds, can enter the lime cycle. When non-fossil fuels are used, the average iron content of the lime sludge may be even 100-200 mg/kg.

Besides the lime sludge, one source of foreign matter is the purchased chemicals: for example, iron and other foreign matters may enter the lime cycle together with the make-up chemicals.

As stated above, the iron which travels in association with the white liquor, is generally in the form of a bivalent iron compound, this ferrous iron being oxidised by oxygen in the MOXY process into ferric iron: $Fe^{2+} \rightarrow Fe^{3+}$. The ferric iron, in turn, oxidises the sulphide to elemental sulphur, according to Formula I:

$$2Fe^{3+}+S^{2-} => 2Fe^{2+}+S^{\circ}$$   I

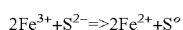

In one embodiment, elemental sulphur, which is precipitated in the activated carbon catalyst, is dissolved by using a sodium sulphide-comprising washing liquid.

In one embodiment, the washing liquid used is white liquor or green liquor or a mixture thereof.

The washing liquid comprising sodium sulphide may be, for example, white liquor which is used in the production of polysulphide liquor, which white liquor is diluted with water, if desired.

In one embodiment, the washing liquid comprises sodium sulphide, possibly together with sodium hydroxide or sodium carbonate or a mixture thereof, and the amount of its active alkali is 10-200 g/l, especially approximately 100-120 g/l, and the sulphidity approximately 10-50%, especially approximately 30-35%.

Most suitably, the sodium sulphide solution which is used for the washing is essentially free of iron. This means in practice that the iron content of the sodium sulphide solution is less than 1 mg/l.

The sodium sulphide solution treatment is generally carried out at an elevated temperature. The treatment can be performed at overpressure or preferably at normal atmospheric pressure.

Most suitably, the temperature used is approximately 30-120° C., especially approximately 50-95° C.

The sodium sulphide solution treatment is carried out without the presence of air/oxygen gas, i.e. in the washing, most suitably present are only the liquid phase formed of the sodium sulphide solution, and the solid matter phase formed of the solid catalyst. The duration time of the sodium sulphide treatment is approximately 1 minute to 10 hours, most suitably approximately 10 minutes to 5 hours. Most suitably, the sodium sulphide solution is recirculated through the catalyst bed.

The washing may be single- or multi-staged.

In one embodiment, the activated carbon catalyst is regenerated by subjecting it to a multi-staged washing which comprises at least one step of washing carried out with sodium sulphide and at least one step of washing carried out with an acidic washing liquid. The sodium sulphide washing removes elemental sulphur and the acid washing removes iron and other metals.

The embodiment is particularly advantageous because an acid or alkali washing alone does not completely eliminate the problem caused by the sulphur and metal precipitate, and by using a two-stage washing it is possible to prevent destruction of the catalyst before the end of the projected use life. In one embodiment of such a multi-stage washing, at least one of the sodium sulphide washing steps is followed by at least one washing step which is carried out using an acidic washing liquid. In a preferred embodiment, acidification is carried out first, followed by rinsing using sodium sulphide.

Most suitably, after the preparation of the orange liquor and, correspondingly, after the sodium sulphide washing step, the activated carbon catalyst is rinsed with a liquid in order to remove the sulphur residues before the acid washing step. In particular, the activated carbon catalyst is rinsed until the pH value of the effluent of the rinsing water is at least nearly neutral.

In one embodiment, the catalyst is rinsed using an aqueous liquid, most suitably using water, for example using ion-exchanged water.

In the acid washing step, metal precipitate contained in the catalyst, such as iron, manganese, calcium, or magnesium sediment or a mixture thereof, is removed.

The acidic washing liquid used is an organic acid such as formic acid or a similar alkane acid. The acidic washing liquid used can also be a mineral acid, or a mixture thereof. Examples of the inorganic acids are hydrochloric acid and similar mineral acids.

Adequate quantities of acids are used to remove the iron precipitate comprised in the catalyst. Generally, the acidic washing liquid comprises an aqueous solution of an organic or inorganic acid, the concentration of which liquid relative to the acid is 1-15% by weight, especially approximately 4-6% by weight, of the mass of the aqueous solution. Excessive acidity should be avoided in order to avoid problems of corrosion.

The acid treatment is generally carried out at an elevated temperature. The treatment can be carried out at overpressure, but preferably the operation is carried out at normal atmospheric pressure and at a temperature of approximately 30-95° C., especially approximately 40-80° C. The duration time of the acid treatment is generally approximately 1 minute to 10 hours, most suitably approximately 10 minutes to 5 hours.

Most suitably, the acid solution is recirculated through the catalyst bed.

Preferably, the acidification is continued until the final pH-level of the acidification is sufficiently low for the removal of metals. Most suitably, after the acid washing, the pH-value of the catalyst is less than 3.

Based on the above, in one embodiment, the activated carbon catalyst is regenerated by bringing it to a multi-stage washing, in which a) sodium sulphide-comprising washing liquid is used at the first point in time, and b) acidic washing fluid at a second point in time. There might be several such a-steps in sequence; there can also be several b-steps in sequence.

In one preferred embodiment, the washing liquid used comprises sodium sulphide, and the activated carbon catalyst is regenerated by bringing it to a multi-stage washing, which comprises at least one washing step where the washing liquid used comprises sodium sulphide and which is carried out at the first point in time, and one washing step where acidic washing liquid is used and which is carried out at a second point in time, either before the first point in time or after that.

In one embodiment, several sequential sodium sulphide washing steps are carried out, after which at least one washing step is carried out using an acidic washing liquid.

In another embodiment, several sequential washing steps are carried out using acidic washing liquid, after which at least one sodium sulphide washing step is carried out.

In a third embodiment, in the washing sequence, at least one sodium sulphide washing step and at least one washing step which is carried out using an acidic washing liquid, are carried out alternatingly (the washing sequence is a-b or, correspondingly, b-a), after which such a washing sequence is repeated 0 to 5 times.

Schematically, the options described above can be illustrated for example as follows (the letters refer to the a- and b-steps that are described above):

a-b; b-a; a-a-b; b-b-a; a-b-b; b-a-a; a-b-a-b; b-a-b-a; a-b-a-b-a-b; and b-a-b-a-b-a.

By performing the a- and b-steps sequentially and by alternating the steps, the precipitate can be effectively peeled off the catalyst.

The duration time of the water rinsing steps, which are carried out between the acid and the sodium sulphide treatments and both before and after them, is generally approximately 1 minute to 5 hours, most suitably approximately 10 minutes to 2 hours.

After the last sodium sulphide rinsing, a short water rinsing is usually sufficient, in which the recycling pipe system is rinsed to remove the sodium sulphide solution and in turn emptied in order to avoid sodium sulphide remaining in the piping. Rinsing with water between the acid washings and the sodium sulphide rinsings is advantageous because, among other things, the same piping is used in the recirculation of both the acid and, correspondingly, the sodium sulphide solution, in which piping the acid and the white liquor must not meet each other.

The sodium sulphide (for example, the white liquor) rinsing step (step a) can be carried out proactively, which reduces the need for acidification. Sodium sulphide presents no risks, in the same way that acidification does, of generating hydrogen sulphide, nor consumption of the catalyst. The sodium sulphide rinsing brings significant savings in the acidification costs and also in the catalyst costs. The cost of one acidification operation carried out in two acid steps is significant.

In fact, the two-step solution described above can be carried out in at least two different ways.

In the first alternative, the b-step immediately follows the a-step. In practice, the point in time of the acidification is selected in such a way that the time between it and the sodium sulphide washing is typically 0.1-24 hours, especially 0.5-18 hours. This solution is suitable for example in cases where the a- and b-steps are carried out alternatingly, or where several sequential a- or, correspondingly, b-steps are carried out.

Another alternative utilises the possibility of the present solution to extend the time interval of the acidification treatment. Thus, the time between the first (a-step) and the second (b-step) points in time is longer, typically more than 1 day, especially 7 days to 720 days, most suitably 14 days to 180 days.

The following non-limiting example illustrates the present solution. As the example shows, by using the washing liquid comprising sodium sulphide alone, it is possible to reduce the drop in pressure of the catalyst bed by at least 10%, most suitably by at least 15%, especially by 20%.

Example 1

In order to purify the MOXY catalyst, laboratory tests were carried out using formic acid and hydrochloric acid, and using white liquor and an EDTA solution. The variables in the tests were the quantity of chemical and the temperature. In one series of tests, the acidification or other treatment of the catalyst was every time repeated three times, and each time using a new washing solution. The white liquor was not replaced during the washing.

The contaminated catalyst was washed prior to the test using ion-exchanged water in order to remove any white liquor. The foreign matters comprised in the catalyst were analysed before and after the washing tests. In the tests which used formic acid and hydrochloric acid, also the foreign matters comprised in the washing filtrate were analysed. At each test point, the initial and the final pH-values were measured. The test points are shown in Table 1, which also shows the final pH-values.

TABLE 1

The test points and the final pH values

| Acidification | Test 1 | Test 2 | Test 3 | Test 4 | Test 5 | Test 6 | Test 7 |
|---|---|---|---|---|---|---|---|
| HCOOH, % | 3 | 5.5 | 5.5 | | 3 (HCl) | 5.5 (HCl) | |
| EDTA, mol/l | — | — | — | 0.1 | — | — | |
| White liquor | | | | | | | white liquor |
| Temperature, ° C. | 45 | 45 | 60 | 60 | 60 | 60 | 80 |
| Time, min | 45 | 45 | 45 | 45 | 45 | 45 | 60 |
| Final pH | 3.5 | 3.0 | 2.8 | 6.7 | <1 | <1 | 13.5 |
| HCOOH, % | 3 | 5.5 | 5.5 | | 3 (HCl) | 5.5 (HCl) | |
| EDTA, mol/l | — | — | — | 0.1 | — | — | |
| White liquor | | | | | | | white liquor |
| Temperature, ° C. | 45 | 45 | 60 | 60 | 60 | 60 | 80 |
| Time, min | 45 | 45 | 45 | 45 | 45 | 45 | 60 |
| Final pH | 2.8 | 2.4 | 2.2 | 6.5 | <1 | <1 | 13.5 |
| HCOOH, % | 3 | 5.5 | 5.5 | | 3 (HCl) | 5.5 (HCl) | |
| EDTA, mol/l | — | — | — | 0.1 | — | — | |
| White liquor | | | | | | | white liquor |
| Temperature, ° C. | 45 | 45 | 60 | 60 | 60 | 60 | 80 |
| Time, min | 45 | 45 | 45 | 45 | 45 | 45 | 120 |
| Final pH | 2.5 | 2.1 | 1.8 | 6.4 | <1 | <1 | 13.5 |

The results of the laboratory tests, in turn, are shown in Table 2

TABLE 2

The foreign matter percentages of the catalysts at different test points

| | S, mg/kg | Fe, mg/kg | Ca, mg/kg | Mg, mg/kg | Mn, mg/kg |
|---|---|---|---|---|---|
| Contaminated catalyst | 28600 | 25300 | 15400 | 2040 | 670 |
| HCOOH, 3%, 45° C. | 24400 | 17600 | 5440 | 411 | 197 |
| HCOOH, 5.5%, 45° C. | 23700 | 21100 | 4080 | 301 | 171 |
| HCOOH, 5.5%, 60 C. | 24400 | 13400 | 4470 | 340 | 140 |
| HCl, 5.5%, 60 C. | 21700 | 2390 | 404 | 78 | <20 |
| Contaminated catalyst | 68500 | 83100 | 35500 | 13200 | 1360 |
| EDTA | 36300 | 54000 | 26300 | 12200 | 958 |
| HCl, 3%, 60° C. | 35100 | 21900 | 5690 | 1470 | 223 |
| White liquor washing | 36290 | 38900 | 20500 | 7903 | 1035 |

The results show that
formic acid does not remove iron substantially, and no elemental sulphur at all,
hydrochloric acid removes 70-90% of the iron, but the elemental sulphur is not removed, and
removal of manganese, calcium and magnesium is achieved well both by using the formic acid treatment and by the hydrochloric acid treatment, the hydrochloric acid treatment, however, always produces better results.

The white liquor washing is able to remove up to approximately 30-50% of the sulphur comprised in the catalyst.

FIG. 1 shows the effect of white liquor rinsing alone on the pressure difference between the catalyst layers in the reactor. The total pressure difference decreased from 710 mbar to 530 mbar (−180 mbar). FIG. 2 shows the effect of the acidification when repeated twice and using formic acid, on the pressure difference between the catalyst layers. The total pressure difference decreased from 680 mbar to 590 mbar (−90 mbar).

Example 2

Industrial scale tests were carried out in order to purify the MOXY catalyst. The production process of the polysulphide was stopped at the first point in time, at which point two sequential acid washing steps (b-steps) were carried out using formic acid, the aqueous solution concentration of which was 4.5%. Before the acidification, rinsing with water was carried out twice. The water recycling time was approximately 25 minutes. The purpose was to remove as effectively as possible the acid neutralising liquor from the catalysts in order to lower the final pH level of the acidification sufficiently (<3) for the removal of the metals. In the acidification, the acid recirculation time was 60 minutes.

After the first acidification, rinsing with water was carried out for a period of 25 minutes. The total pressure difference decreased from 742 mbar to approximately 644 mbar two hours after the start, i.e. the pressure drop resulting from the washing was −98 mbar. After that, the catalyst was rinsed with water, and then white liquor rinsing was carried out.

The pressure difference decreased from 713 mbar to approximately 560 mbar (−153 mbar) two hours after the start. Thus, at the mill, a clear decrease in pressure difference was achieved after the white liquor rinsing.

REFERENCES

Patent Literature
U.S. Pat. No. 4,024,229
CA 1,205,930
U.S. Pat. No. 4,855,123

The invention claimed is:

1. A method of regenerating an activated carbon catalyst which has been used in the production of polysulphide liquor by oxidation of white liquor that contains amounts of iron in the presence of said catalyst, the method comprising:
    washing the catalyst with a washing liquid without the presence of air or oxygen gas in order to remove a precipitate accumulated in the catalyst,
wherein
    the washing liquid used is a sodium sulphide containing washing liquid.

2. The method according to claim 1, wherein the white liquor used in the production of the polysulphide liquor, which white liquor is to be oxidized, contains at least 1 mg/l of iron.

3. The method according to claim 1, wherein elemental sulphur, which is precipitated into the activated carbon catalyst, is dissolved by using a sodium sulphide containing washing liquid.

4. The method according to claim 1, wherein the washing liquid used is white liquor or green liquor or a mixture thereof.

5. The method according to claim 1, wherein the washing liquid contains sodium sulphide, together with sodium hydroxide or sodium carbonate or a mixture thereof, and the amount of active alkali in it is 10-200 g/l, and its sulphidity is 10-50%.

6. The method according to claim 1, wherein the sodium sulphide containing washing liquid is white liquor used for the production of polysulphide liquor.

7. The method according to claim 1, wherein the activated carbon catalyst is regenerated by subjecting it to a multi-stage washing which comprises at least one sodium sulphide washing step and at least one washing step carried out with an acidic washing liquid.

8. The method according to claim 7, wherein:
at least one sodium sulphide washing step is followed by at least one washing step carried out using an acidic washing liquid or, correspondingly,
at least one washing step which is carried out using an acidic washing liquid is followed by at least one sodium sulphide washing step.

9. The method according to claim 7, wherein prior to the washing step carried out using an acidic washing liquid, the activated carbon catalyst is rinsed in order to remove residues of sulphurous compounds, in particular the activated carbon catalyst is rinsed, until the pH value of an effluent of the rinsing water is at least nearly neutral.

10. The method according to claim 7, wherein in the acid washing step, metal precipitated contained in the catalyst, such as iron, manganese, calcium, or magnesium precipitated or a mixture thereof, is removed.

11. The method according to claim 7, wherein the acidic washing liquid used is an organic or inorganic acid, such as formic acid or a similar alkane acid, or hydrochloric acid or a similar mineral acid, or a mixture thereof.

12. The method according to claim 7, wherein the acidic washing liquid used is an inorganic acid, such as hydrochloric acid or a similar mineral acid, the amount of which is adequate to remove the iron precipitate contained in the catalyst.

13. The method according to claim 7, wherein the acidic washing liquid used is an aqueous solution of an organic or inorganic acid, the acid concentration of which liquid is 1-15% by weight.

14. The method according to claim 7, wherein the activated carbon catalyst is regenerated by subjecting it to a multi-stage washing comprising:
at least one washing step in which the washing liquid used comprises sodium sulphide, and which step is carried out at a first point in time, and
one washing step in which an acidic washing liquid is used, and which is carried out at a second point in time, either before the first point in time or after the first point in time.

15. The method according to claim 14, wherein:
several sodium sulphide washing steps are carried out in sequence, after which at least one washing step is carried out using an acidic washing liquid;
several washing steps are carried out in sequence using an acidic washing liquid, after which at least one sodium sulphide washing step is carried out; and
in a washing sequence, at least one sodium sulphide washing step and at least one washing step which is carried out using an acidic washing liquid are carried out alternatingly, after which the washing sequence is repeated 0 to 5 times.

16. The method according to claim 14, wherein the second point in time follows immediately after the first point in time, in particular the time period between the first and the second point in time is 0.1-24 hours.

17. The method according to claim 14, wherein the time period between the first and the second point in time is more than 1 day.

18. The method according to claim 7, wherein the activated carbon catalyst is regenerated by subjecting it to a multi-stage washing comprising several washing steps in which the washing liquid used comprises sodium sulphide, and the washing step in which an acidic washing liquid is used is carried out no earlier than after the last washing step that comprises sodium sulphide.

19. The method according to claim 1, wherein the white liquor to be oxidised is obtained from the chemical cycle of a sulphate or polysulphide mill, in which cycle non-fossil fuel is used in a lime sludge re-burning, in particular, wood-based fuel, such as bark or wood chips or similar wood fuels, is used in the lime sludge re-burning.

20. A method of regenerating an activated carbon catalyst which is used in the production of polysulphide liquor by oxidation of white liquor that contains essential amounts of iron in the presence of said catalyst, wherein:
the catalyst is washed with a washing liquid in order to remove a precipitate accumulated in the catalyst,
the washing liquid used is a sodium sulphide containing washing liquid, and
the catalyst is treated with a washing liquid comprising sodium sulphide, until the drop in pressure over it is reduced by at least 10%.

21. A method of regenerating an activated carbon catalyst, the method comprising:
producing polysulphide liquor by oxidation of white liquor that contains amounts of iron in the presence of said catalyst, and
regenerating the activated carbon catalyst by subjecting it to a multi-stage washing to remove a precipitate accumulated in the catalyst which comprises at least one sodium sulphide washing step and which step is carried out at a first point in time and at least one washing step carried out with an acidic washing liquid which is carried out at a second point in time, either before the first point in time or after the first point in time;
wherein several sodium sulphide washing steps are carried out in sequence, after which at least one washing step is carried out using an acidic washing liquid; and
wherein several washing steps are carried out in sequence using an acidic washing liquid, after which at least one sodium sulphide washing step is carried out;
in a washing sequence, at least one sodium sulphide washing step and at least one washing step which is carried out using an acidic washing liquid are carried out alternatingly, after which the washing sequence is repeated 0 to 5 times.

* * * * *